Dec. 20, 1960  R. ADLER  2,965,714
SIMULTANEOUSLY TRANSMITTING AND RECEIVING
FOLLOW-UP SYSTEM AND APPARATUS
Filed June 5, 1957
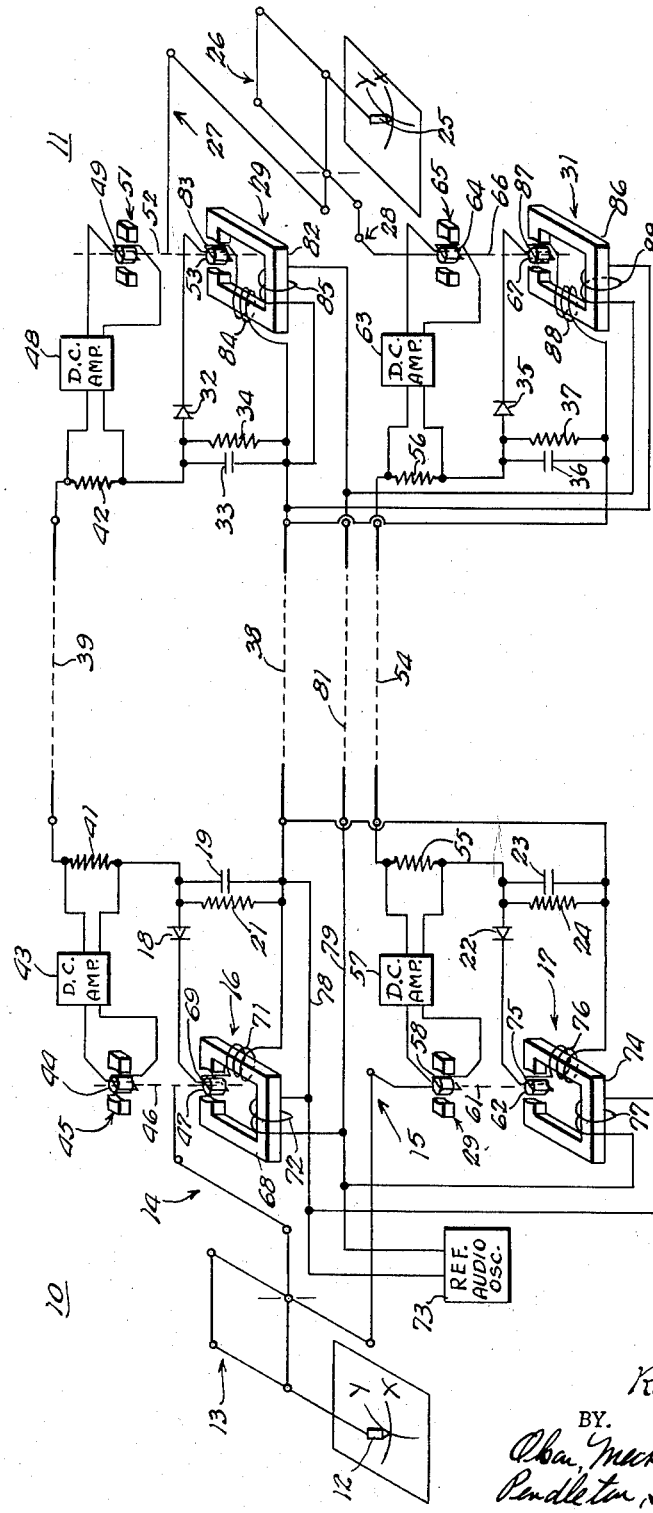
INVENTOR.
Robert Adler.
BY United States Patent Office
2,965,714
Patented Dec. 20, 1960

2,965,714

SIMULTANEOUSLY TRANSMITTING AND RECEIVING FOLLOW-UP SYSTEM AND APPARATUS

Robert Adler, Northfield, Ill., assignor, by mesne assignments, to Peter G. S. Mero, doing business as Electrowriter Company Filed June 5, 1957, Ser. No. 663,651

9 Claims. (Cl. 178—18)

This invention relates to follow-up systems and apparatus and more particularly to follow-up systems and apparatus for transmitting written intelligence such as handwriting, and it is an object of the invention to provide improved apparatus of this character.

It is a further object of the invention to provide a written intelligence transmitting and receiving apparatus and system wherein the transmission and reception is truly simultaneous in the sense that both transmitting and receiving units are transmitting and receiving continuously.

It is a further object of the invention to provide written intelligence transmitting and receiving apparatus and systems of the foregoing character which are relatively simple in form and efficient in operation.

The prior art written intelligence transmitting and receiving apparatus has not been truly simultaneous; that is to say, a transmitter, while transmitting, has not, at the same time, been receiving. It has been necessary in such prior devices to operate certain switches to change the transmitter-receiver from one condition, say transmitting, to the other, say receiving. According to the invention, each transmitter-receiver is functioning in both capacities simultaneously at all times. This is achieved according to one form of the invention by providing the difference or error signal simultaneously at each station and continuously using it to energize the driving means at both stations.

For a more complete understanding of the invention, reference should be had to the accompanying drawing, in which the single figure is a diagrammatic representation and circuit diagram of one form of apparatus embodying the invention.

Referring to the drawing there is shown a written intelligence transmitting and receiving apparatus and system including two transmitting-receiving stations 10 and 11 which may be termed a tele-autographic system.

At the station 10 there is a stylus 12 forming part of a parallelogram linkage 13 which resolves the motion of stylus 12 into two components, termed Y- and X-components, and transmits these component motions by means of linkages 14 and 15 to signal generators 16 and 17, respectively. The signal generators generate A.C. signals whose amplitudes correspond, respectively, in magnitude to the positions of stylus 12 along the Y- and X-coordinate directions, respectively, for constant excitation of the generators. The A.C. voltage of signal generator 16 is rectified by rectifier 18, and the resulting D.C. voltage appears across capacitor 19 and resistor 21, which D.C. voltage has an amplitude corresponding to the position of stylus 12 along the Y-coordinate direction.

Similarly, the A.C. signal output of signal generator 17 is rectified by rectifier 22 and the resulting D.C. voltage appears across capacitor 23 and resistor 24, which D.C. voltage has an amplitude corresponding to the position of stylus 12 along the X-coordinate direction.

At the station 11 there is provided a following or receiving stylus 25 whose motion consists of two motions along Y- and X-coordinate directions corresponding to those coordinate directions at station 10, the coordinate motions being provided by the parallelogram linkage mechanism 26. When stylus 25 is following or receiving, parallelogram linkage 26 is actuated through linkages 27 and 28 for the Y- and X-coordinate directions, respectively, and when stylus 25 is transmitting, the parallelogram linkage mechanism 26 resolves the motion into two components along the Y- and X-coordinate directions, respectively, through the linkages 27 and 28. Through the linkages indicated, A.C. signals whose amplitudes correspond to the position of stylus 25 along the Y- and X-coordinate directions, respectively, are generated by means of signal generators 29 and 31 for constant excitation of the generators.

The A.C. signal generated by signal generator or rotary transformer 29 is rectified by rectifier 32, and the resulting D.C. voltage appears across capacitor 33 and resistor 34, which D.C. voltage has an amplitude corresponding to the position of the stylus 25 along the Y-coordinate direction. The A.C. signal output of signal generator or rotary transformer 31 is rectified by rectifier 35 and the resulting D.C. voltage appears across capacitor 36 and resistor 37, which D.C. voltage has an amplitude corresponding to the position of the stylus 25 along the X-coordinate direction.

The D.C. voltages appearing across capacitors 19 and 33 and corresponding, respectively, to the positions of the styli 12 and 25 along the Y-coordinate direction are continuously compared by means of the transmission line conductors 38 and 39 and equal resistors 41 and 42 connected in series with the transmission line conductor 39, the resistor 41 being disposed at the station 10 and the resistor 42 being disposed at station 11. Thus, any error or difference voltage which exists in the transmission line 38, 39 circuit appears in equal amounts of half magnitude across each of resistors 41 and 42.

The resistor 41 is connected to D.C. amplifier 43 which in turn supplies an operating voltage to the movable coil 44 of a motor unit 45 which may be of the D-Arsonval type, the movable coil 44 being mounted on a shaft or axis 46 which is also connected to one arm of the linkage mechanism 14 and to the rotor 47 of the rotary transformer 16. Thus, when a voltage appears across resistor 41, the amplifier 43 energizes motor unit 45 for driving the stylus 12 along the Y-coordinate direction by means of linkage mechanism 13 when this station is receiving and for tending to resist such motion of stylus 12 when this station is transmitting. Correspondingly, the resistor 42 is connected to a D.C. amplifier 48, the output of which is connected to the moving coil 49 of a motor unit 51, the moving coil 49 being mounted on a shaft or axis 52 which is connected to one arm of the linkage mechanism 27 and to the rotor 53 of the rotary transformer 29. Thus, when a voltage appears across resistor 42, the amplifier 48 energizes motor unit 51 for driving the stylus 25 along the Y-coordinate direction by means of linkage mechanism 26 when this station is receiving and for tending to resist the motion of stylus 25 when this station is transmitting.

When the styli 12 and 25 are in corresponding positions and the circuit is properly balanced, the voltages appearing across capacitors 19 and 33 are equal and thus no difference or error voltage exists in the transmission line 38, 39 circuit and, correspondingly, no voltage exists across resistors 41 and 42.

As described in connection with the Y-coordinate signal channel, in the X-coordinate signal channel, the voltages appearing across capacitors 23 and 36 are continuously compared in the transmission line circuit consisting of conductors 54 and 38, there being connected in the transmission line conductor 54 resistors of equal magnitude 55 and 56, respectively, at stations 10 and 11. Whenever a difference in voltage exists between the capacitors 23 and 36 as a result of a lack of correspondence in position of the styli 12 and 25 along the X-coordinate direction, equal voltages of half magnitude appear across resistors 55 and 56, these voltages being utilized to effect driving of the styli at each station through the appropriate linkage mechanism or to tend to resist motion thereof. The resistor 55 is connected to D.C. amplifier 57 which in turn is connected to the moving coil 58 of motor unit 59, the coil 58 being mounted on a shaft or axis 61 which is connected to one arm of linkage mechanism 15 and also to the rotor 62 of rotary transformer 17. Thus, when a voltage appears across resistor 55, the amplifier 57 energizes motor unit 59 for driving the stylus 12 along the X-coordinate direction by means of linkage mechanism 13 when this station is receiving and for tending to resist the motion of stylus 12 when this station is transmitting.

Correspondingly, at station 11, the resistor 56 is connected across a D.C. amplifier 63 which is in turn connected to the moving coil 64 of a motor unit 65, the moving coil 64 being mounted on a shaft or axis 66 which is connected to one arm of the linkage mechanism 28 and also to the rotor 67 of the rotary transformer 31. Thus, when a voltage appears across resistor 56, the D.C. amplifier 63 energizes motor unit 65 for driving the stylus 25 by means of linkage mechanism 26 when this station is receiving and for tending to resist the motion of stylus 25 when this station is transmitting.

When the styli 12 and 25 occupy corresponding positions along the X-coordinate direction, there is no voltage existing in the transmission line 54, 38 circuit and consequently no voltages exist across resistors 55 and 56.

The linkage mechanisms 13 and 26 are of the form disclosed and broadly claimed in applicant's prior Patent No. 2,583,535, dated January 29, 1952, and assigned to the same assignee as the subject invention.

The signal generating unit 16 or rotary transformer comprises a core 68 including a gap within which rotor 47 is mounted and upon which a winding 69 is disposed. A fixed winding 71, also disposed on core 68, is connected in series with winding 69, the combined voltage of these two windings having an amplitude corresponding to the position of stylus 12 along the Y-coordinate direction for a constant excitation of the generator, as is described in greater detail in applicant's prior patent No. 2,649,503, dated August 18, 1953, and assigned to the same assignee as the present invention. Briefly, it may be noted that the winding 69 as it rotates in the air gap will have voltages induced into it depending upon its position, which voltage is added to that of winding 71 to avoid ambiguities resulting from zero voltages induced in winding 69.

Excitation is provided by an exciting winding 72 which is energized preferably, but not necessarily, with a constant amplitude fixed frequency voltage from reference audio oscillator 73, which frequency might be, for example, 3,000 cycles. Similarly, the signal generating unit 17 or rotary transformer includes a core 74 having a gap within which the rotor 62 is disposed and on which a winding 75 is arranged, which winding is connected in series with a fixed winding 76, also disposed on core 74. The combined voltage of windings 75 and 76 has an amplitude corresponding to the position of stylus 12 along the X-coordinate direction for a constant excitation of the generator. An exciting winding 77 is disposed on the core 74 and is connected to be excited from reference audio oscillator 73.

The signal from reference audio oscillator 73 is transmitted by means of conductors 78 and 79 to transmission lines 38 and 81, respectively, for transmission to station 11.

The signal generating unit or rotary transformer 29 at station 11 comprises a core 82 including a gap within which rotor 53 is mounted and on which a winding 83 is disposed. A fixed winding 84 on core 82 is connected in series with winding 83 and the combined voltage of these two windings corresponds to the position of stylus 25 along the Y-coordinate direction for a constant excitation of the generator. An exciting winding 85 is disposed on core 86 and is connected to transmission line conductors 38 and 81 for excitation from reference audio oscillators 73.

The signal generator or rotary transformer 31 comprises a core 86 including a gap in which rotor 67 is adapted to move and on which a winding 87 is disposed. The winding 87 is connected in series with a fixed winding 88, also mounted on the core 86, the combined voltage of these two windings representing the position of the stylus 25 along the X-coordinate direction for a constant excitation of the generator. A winding 89 is disposed on core 86 for excitation thereof and is connected to transmission line conductors 38 and 81 and thus to reference audio oscillator 73.

Whatever attenuation takes place in the transmission line conductors 38, 39 and 54 in transmitting the X- and Y-coordinate signals is compensated for by the fact that corresponding attenuation also takes place in the transmission line conductor 81 in combination with conductor 38, which transmits the reference signal. As is explained in greater detail in applicant's aforesaid Patent No. 2,649,503 and in the application entitled "Follow-Up Systems and Apparatus," filed June 5, 1957, Serial No. 663,652, and assigned to the same assignee as the subject invention, the rotary transformers 16, 17, 29 and 31 are ratio devices, that is the positions of the rotary coils 69, 83, 75 and 87, and thus of the coordinate positions of the styli 12 and 25, correspond at each instant to the ratios between the coordinate signal amplitude and the reference amplitude for each generator. Then, if the signal amplitude attenuates by a certain percentage and the reference amplitude attenuates by the same percentage, the final positions of the rotor members and thus of the stylus members will be correct. Changes in the amplitude of the signal generated by the reference oscillator 73 also do not cause errors in the position of the styli, since the ratio effects in the signal generators compensate for them in the same manner.

With the foregoing explanation of structure, the operation of the device may be understood as follows:

Suppose that in one particular instance an operator picks up stylus 12 and starts to write with it. At the instant of starting to write, the styli 12 and 25 are assumed to be at rest and in corresponding positions. Accordingly, as stylus 12 begins to move, the rotors 47 and 62 moves to new positions, thereby altering the output voltages thereof and correspondingly the D.C. voltages appearing across capacitors 19 and 23. Instantaneously, the voltages appearing across capacitors 33 and 36 remain the same and consequently differences or error voltages exist across resistors 41 and 42 and resistors 55 and 56, as hereinbefore explained. The voltages appearing across resistors 42 and 56 immediately effect energization of motor units 51 and 65, thereby causing the stylus 25 to move under the influence of linkage mechanism 26. As the stylus 25 moves, the rotary windings 83 and 87 of the local signal generating units 29 and 31 also move and thereby change their output voltages. This in turn alters the D.C. voltages appearing across capacitors 33 and 36 in the direction of the voltage changes across capacitors 19 and 23. This process continues until a balance is again achieved in the transmission line or error signal networks.

Suppose now that the operator at station 10 releases stylus 12 and that the operator at station 11 picks up stylus 25 and begins to write with it. Assume, as before, that the two styli are in corresponding positions initially. As stylus 25 moves, the linkage mechanism 26, through links 27 and 28, alters the position of rotary windings 83 and 87, thereby changing the output voltages of the generators 29 and 31. Corresponding changes occur in the D.C. voltages across capacitors 33 and 36, thereby causing differences or error voltages to exist in the transmission line circuits, i.e. across resistors 41 and 42 and resistors 55 and 56. The voltages existing across resistors 41 and 55 at station 10 effect energization of motor units 45 and 59, thereby causing linkage mechanism 13 to drive stylus 12 in the direction of motion of stylus 25. As stylus 12 moves, the positions of rotary windings 69 and 75 also change, thereby changing the output voltage of the rotary transformers 16 and 17. Consequently, the D.C. voltages across capacitors 19 and 23 also change in the direction of the voltage changes across capacitors 33 and 36. This process continues until the error voltages in the transmission circuits are again zero.

Suppose that operators simultaneously take the styli 12 and 25 in hand and initiate writing movements. Each operator will thereupon feel resistance to the motion of his particular stylus, inasmuch as the error voltages which appear in the transmission line circuit act upon the motor units 45 and 59 at one station as well as the motor units 51 and 65 at the other station; that is to say, whenever error voltages exist in the transmission line circuits, the motor units at both stations tend to drive the styli thereat in such a direction as to eliminate the errors. If only one stylus is being moved positively, then the reaction force felt upon it by energization of the motor units at that station is small, since the error voltage developed is small. However, when the motion of one stylus is resisted, then large error voltages exist and the reaction felt by the operator of a particular stylus will be large.

A system of the character described has particular application over relatively short distances wherein time delays existing in the various circuits do not render the units unstable. It is a unit having considerable advantage in that all that is necesary is to pick up the stylus and initiate writing, no switching, for example, being required.

While a particular embodiment of the invention has been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. A short range simultaneous transmitting and receiving follow-up system comprising a first transmitter-receiver including a first transmitting-receiving element, a first generator for generating a signal whose amplitude corresponds to the position of said first transmitting-receiving element and motor means connected to said first transmitting-receiving element for driving it during receiving conditions and urging it against motion during transmitting conditions, a second transmitter-receiver including a second transmitting-receiving element, a second generator for generating a signal whose amplitude corresponds to the position of said second transmitting-receiving element and motor means connected to said second transmitting-receiving element for driving it during receiving conditions and urging it against motion during transmitting conditions, a circuit between said first generator and said second generator for continuously comparing the signals of said first and said second generators and providing a difference signal corresponding to the difference between the positions of said first and said second transmitting-receiving elements, said circuit including means at said first transmitter-receiver and means at said second transmitter-receiver for simultaneously providing one portion of said difference signal at said first transmitter-receiver and a second portion of said difference signal at said second transmitter-receiver, means at said second transmitter-receiver energized in accordance with said second portion of said difference signal thereat for energizing said second motor means when said second transmitter-receiver is receiving and when it is transmitting, and means at said first transmitter-receiver energized in accordance with said one portion of said difference signal thereat for energizing said first motor means when said first transmitter-receiver is transmitting and when it is receiving.

2. A short range simultaneous transmitting and receiving follow-up system comprising a first transmitter-receiver including a first transmitting-receiving element, a first generator for generating a signal whose amplitude corresponds to the positions of said first transmitting-receiving element and motor means connected to said first transmitting-receiving element for driving it during receiving conditions and urging it against motion during transmitting conditions, a second transmitter-receiver including a second transmitting-receiving element, a second generator for generating a signal whose amplitude corresponds to the position of said second transmitting-receiving element and motor means connected to said second transmitting-receiving element for driving it during receiving conditions and urging it against motion during transmitting conditions, means for exciting said first and second generators from a common source, a circuit between said first generator and said second generator for continuously comparing the signals of said first and said second generators and providing a difference signal corresponding to the difference between the positions of said first and said second transmitting-receiving elements, said circuit including means at said first transmitter-receiver and means at said second transmitter-receiver for simultaneously providing one portion of said difference signal at said first transmitter-receiver and a second portion of said difference signal at said second transmitter-receiver, means at said second transmitter-receiver energized in accordance with said second portion of said difference signal thereat for energizing said second motor means when said second transmitter-receiver is receiving and when it is transmitting, and means at said first transmitter-receiver energized in accordance with said one portion of said difference signal thereat for energizing said first motor means when said first transmitter-receiver is transmitting and when it is receiving.

3. A short range simultaneous transmitting and receiving follow-up system comprising a first transmitter-receiver including a first transmitting-receiving element, a first generator including an exciting winding for generating a signal ratio whose amplitude corresponds to the position of said first transmitting-receiving element and motor means connected to said first transmitting-receiving element for driving it during receiving conditions and urging it against motion during transmitting conditions, a second transmitter-receiver including a second transmitting-receiving mechanism, a second generator including an exciting winding for generating a signal ratio whose amplitude corresponds to the position of said second transmitting-receiving element and motor means connected to said second transmitting-receiving element for driving it during receiving conditions and urging it against motion during transmitting conditions, means for exciting said first and second generators from a common source, a circuit between said first generator and said second generator for continuously comparing the signals of said first and said second generators and providing a difference signal corresponding to the difference between the positions of said first and said second transmitting-receiving elements, said circuit including means at said first transmitter-receiver and means at said second transmitter-receiver for simultaneously providing one portion of said difference signal at said first transmitter-receiver and a second portion of said difference signal at said second transmitter-receiver, means at said second transmitter-receiver energized in accordance with said second portion of said difference signal thereat for energizing said second motor means when said second transmitter-receiver is receiving and when it is transmitting, and means at said first transmitter-receiver energized in accordance with said one portion of said difference signal thereat for energizing said first motor means when said first transmitter-receiver is transmitting and when it is receiving.

4. A short range simultaneous transmitting and receiving follow-up system comprising a first transmitter-receiver including a first transmitting-receiving element, a first rotary transformer including a rotor connected to said first transmitting-receiving element and an exciting winding for generating a signal whose amplitude corresponds to the position of said first transmitting-receiving element and motor means connected to said first transmitting-receiving mechanism for driving it during receiving conditions and urging it against motion during transmitting conditions; a second transmitter-receiver including a second transmitting-receiving mechanism, a second rotary transformer including a rotor connected to said second transmitting-receiving element and an exciting winding for generating a signal whose amplitude corresponds to the position of said second transmitting-receiving element and motor means connected to said second transmitting-receiving element for driving it during receiving conditions and urging it against motion during transmitting conditions; a common excitation source connected to the exciting windings of the rotary transformers at both said first and said second transmitter receivers; a circuit between said first generator and said second generator for continuously comparing the signals of said first and said second generators and providing a difference signal corresponding to the difference between the positions of said first and said second transmitting-receiving elements; said circuit including means at said first transmitter-receiver and means at said second transmitter-receiver for simultaneously providing one portion of said difference signal at said first transmitter-receiver and a second portion of said difference signal at said second transmitter-receiver; means at said second transmitter-receiver energized in accordance with said second portion of said difference signal thereat for energizing said second motor means when said second transmitter-receiver is receiving and when it is transmitting; and means at said first transmitter-receiver energized in accordance with said one portion of said difference signal thereat for energizing said first motor means when said first transmitter-receiver is transmitting and when it is receiving.

5. A short range simultaneous transmitting and receiving follow-up system comprising a first transmitter-receiver including a first transmitting-receiving element, a first rotary transformer including a rotor connected to said first transmitting-receiving element and an exciting winding for generating a signal whose amplitude corresponds to the position of said first transmitting-receiving element and motor means connected to said first transmitting-receiving element for driving it during receiving conditions and urging it against motion during transmitting conditions; a second transmitter-receiver including a second transmitting-receiving element, a second rotary transformer including a rotor connected to second transmitting-receiving element and an exciting winding for generating a signal whose amplitude corresponds to the position of said second transmitting-receiving element and motor means connected to said second transmitting-receiving element for driving it during receiving conditions and urging it against motion during transmitting conditions; a common excitation source connected to the exciting windings of the rotary transformers at both said first and said second transmitter receivers; a circuit including a relatively short transmission line between said first generator and said second generator for continuously comparing the signals of said first and said second generators and providing a difference signal corresponding to the difference between the positions of said first and said second transmitting-receiving elements; said circuit including means at said first transmitter-receiver and means at said second transmitter-receiver for simultaneously providing one portion of said difference signal at said first transmitter-receiver and a second portion of said difference signal at said second transmitter receiver; means at said second transmitter-receiver energized in accordance with said second portion of said difference signal thereat for energizing said second motor means when said second transmitter-receiver is receiving and when it is transmitting; and means at said first transmitter-receiver energized in accordance with said one portion of said difference signal thereat for energizing said first motor means when said first transmitter-receiver is transmitting and when it is receiving.

6. A short range simultaneous transmitting and receiving follow-up system comprising a first transmitter-receiver including a first transmitting-receiving element, a first rotary transformer including a rotor connected to said first transmitting-receiving mechanism and an exciting winding for generating a signal whose amplitude corresponds to the position of said first transmitting-receiving elements and motor means connected to said first transmitting-receiving elements for driving it during receiving conditions and urging it against motion during transmitting conditions; a second transmitter-receiver including a second transmitting-receiving element, a second rotary transformer including a rotor connected to said second transmitting-receiving element and an exciting winding for generating a signal whose amplitude corresponds to the position of said second transmitting-receiving element and motor means connected to said second transmitting-receiving element for driving it during receiving conditions and urging it against motion during transmitting conditions; a circuit including a relatively short transmission line between said first generator and said second generator for continuously comparing the signals of said first and said second generators and providing a difference signal corresponding to the difference between the positions of said first and said second transmitting-receiving elements; said circuit including means at said first transmitter-receiver and means at said second transmitter-receiver for simultaneously providing one portion of said difference signal at said first transmitter-receiver and a second portion of said difference signal at said second transmitter-receiver; a source of excitation for the exciting windings of the rotary transformers at both said first and said second transmitter-receivers; a relatively short transmission line connecting said source to both said exciting windings; means at said second transmitter-receiver energized in accordance with said second portion of said difference signal thereat for energizing said second motor means when said second transmitter-receiver is receiving and when it is transmitting; and means at said first transmitter-receiver energized in accordance with said one portion of said difference signal thereat for energizing said first motor means when said first transmitter-receiver is transmitting and when it is receiving.

7. A short range simultaneous transmitting and receiving follow-up system comprising a first transmitter-receiver including a first transmitting-receiving element, a first rotary transformer including a rotor connected to said first transmitting-receiving element and an exciting winding for generating a signal whose amplitude corresponds to the position of said first transmitting-receiving element, first means for rectifying said signal and motor means connected to said first transmitting-receiving element for driving it during receiving conditions and urging it against motion during transmitting conditions; a second transmitter-receiver including a second transmitting-receiving element, a second rotary transformer including a rotor connected to said second transmitting-receiving element and an exciting winding for generating a signal whose amplitude corresponds to the position of said second transmitting-receiving element, second means for rectifying said signal and motor means connected to said second transmitting-receiving element for driving it during receiving conditions and urging it against motion during transmitting conditions; a circuit including a relatively short transmission line between said first rectifying means and said second rectifying means for continuously comparing the signals of said first and said second generators and providing a D.C. difference signal corresponding to the difference between the positions of said first and said second transmitting-receiving elements; said circuit including means at said first transmitter-receiver and means at said second transmitter-receiver for simultaneously providing one portion of said difference signal at said first transmitter-receiver and a second portion of said difference signal at said second transmitter-receiver; a source of A.C. excitation for the exciting windings of the rotary transformers at both said first and said second transmitter-receivers; a relatively short transmission line connecting said source to both said exciting windings; means at said second transmitter-receiver energized in accordance with said second portion of said difference signal thereat for energizing said second motor means when said second transmitter-receiver is receiving and when it is transmitting; and means at said first transmitter-receiver energized in accordance with said one portion of said difference signal thereat for energizing said first motor means when said first transmitter-receiver is transmitting and when it is receiving.

8. A short range simultaneous transmitting and receiving follow-up system comprising a first transmitter-receiver including a first transmitting-receiving element, a first rotary transformer including a rotor connected to said first transmitting-receiving element and an exciting winding for generating a signal whose amplitude corresponds to the position of said first transmitting-receiving element, first means for rectifying said signal and motor means connected to said first transmitting-receiving element for driving it during receiving conditions and urging it against motion during transmitting conditions; a second transmitter-receiver including a second transmitting-receiving element, a second rotary transformer including a rotor connected to said second transmitting-receiving element and an exciting winding for generating a signal whose amplitude corresponds to the position of said second transmitting-receiving element, second means for rectifying said signal and motor means connected to said second transmitting-receiving element for driving it during receiving conditions and urging it against motion during transmitting conditions; a circuit including a relatively short transmission line between said first rectifying means and said second rectifying means, resistance means at said first transmitter-receiver and resistance means at said second transmitter-receiver for continuously comparing the signals of said first and said second generators and providing simultaneous D.C. difference signals across the respective resistance means at said first and said second transmitter-receivers corresponding to the difference between the positions of said first and said second transmitting-receiving elements; a source of A.C. excitation for the exciting windings of the rotary transformers at both said first and said second transmitter-receivers; a relatively short transmission line connecting said source to both said exciting windings; means at said second transmitter-receiver energized from the difference signal across the resistance means for energizing said second motor means when said second transmitter-receiver is receiving and when it is transmitting; and means at said first transmitter-receiver energized from the difference signal across the resistance means thereat for energizing said first motor means when said first transmitter-receiver is transmitting and when it is receiving.

9. A short range simultaneous transmitting and receiving follow-up system comprising a first transmitter-receiver including a first transmitting-receiving element, a first rotary transformer including an exciting winding, a fixed winding and a winding on a rotor mechanically connected to said first transmitting-receiving element to be driven thereby, said fixed winding and said rotor winding being connected in series for generating an A.C. signal whose amplitude corresponds to the position of said first transmitting-receiving element, first means for rectifying said signal and motor means connected to said first transmitting-receiving element for driving it during receiving conditions and urging it against motion during transmitting conditions; a second transmitter-receiver including a second transmitting-receiving element, a second rotary transformer including an exciting winding, a fixed winding and a winding on a rotor connected to said second transmitting-receiving element, said fixed winding and said rotor winding being connected in series for generating an A.C. signal whose amplitude corresponds to the position of said second transmitting-receiving element, second means for rectifying said signal, and motor means connected to said second transmitting-receiving mechanism for driving it during receiving conditions and urging it against motion during transmitting conditions; a circuit including a relatively short transmission line between said first rectifying means and said second rectifying means, resistance means at said first transmitter-receiver and resistance means at said second transmitter-receiver for continuously comparing the signals of said first and said second generators and providing simultaneous D.C. difference signals across the respective resistance means at said first and said second transmitter-receivers corresponding to the difference between the positions of said first and said second transmitting-receiving elements; a source of A.C. excitation for the exciting windings of the rotary transformers at both said first and said second transmitter-receivers; a relatively short transmission line connecting said source to both said exciting windings; means at said second transmitter-receiver energized from the difference signal across the resistance means thereat for energizing said second motor means when said second transmitter-receiver is receiving and when it is transmitting; and means at said first transmitter-receiver energized from the difference signal across the resistance means thereat for energizing said first motor means when said first transmitter-receiver is transmitting and when it is receiving.

References Cited in the file of this patent

UNITED STATES PATENTS

| | | |
|---|---|---|
| 2,462,904 | Rosen | Mar. 1, 1949 |
| 2,583,535 | Adler | Jan. 29, 1952 |
| 2,583,720 | Adler | Jan. 29, 1952 |
| 2,623,943 | Adler | Dec. 20, 1952 |
| 2,649,503 | Adler | Aug. 18, 1953 |